United States Patent
McKisson et al.

(10) Patent No.: US 9,123,611 B1
(45) Date of Patent: Sep. 1, 2015

(54) METHOD FOR PASSIVELY COMPENSATING FOR TEMPERATURE COEFFICIENT OF GAIN IN SILICON PHOTOMULTIPLIERS AND SIMILAR DEVICES

(71) Applicant: Jefferson Science Associates, LLC, Newport News, VA (US)

(72) Inventors: John E. McKisson, Williamsburg, VA (US); Fernando Barbosa, Toano, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 183 days.

(21) Appl. No.: 14/063,627

(22) Filed: Oct. 25, 2013

Related U.S. Application Data

(60) Provisional application No. 61/719,378, filed on Oct. 27, 2012.

(51) Int. Cl.
*G01J 1/44* (2006.01)
*H01L 27/146* (2006.01)

(52) U.S. Cl.
CPC ................ *H01L 27/14643* (2013.01)

(58) Field of Classification Search
CPC .................. H01L 31/02027; H01L 31/107
USPC ......................................... 250/214 R
See application file for complete search history.

(56) References Cited

U.S. PATENT DOCUMENTS 5,116,136 A * 5/1992 Newman et al. .............. 374/102

\* cited by examiner

*Primary Examiner* — Thanh Luu

(57) ABSTRACT

A method for designing a completely passive bias compensation circuit to stabilize the gain of multiple pixel avalanche photo detector devices. The method includes determining circuitry design and component values to achieve a desired precision of gain stability. The method can be used with any temperature sensitive device with a nominally linear coefficient of voltage dependent parameter that must be stabilized. The circuitry design includes a negative temperature coefficient resistor in thermal contact with the photomultiplier device to provide a varying resistance and a second fixed resistor to form a voltage divider that can be chosen to set the desired slope and intercept for the characteristic with a specific voltage source value. The addition of a third resistor to the divider network provides a solution set for a set of SiPM devices that requires only a single stabilized voltage source value.

3 Claims, 1 Drawing Sheet

METHOD FOR PASSIVELY COMPENSATING FOR TEMPERATURE COEFFICIENT OF GAIN IN SILICON PHOTOMULTIPLIERS AND SIMILAR DEVICES

This application claims priority to provisional U.S. Application No. 61/719,378, filed Oct. 27, 2012, the contents of which are incorporated herein by reference in their entirety.

The United States government may have certain rights to this invention under Management and Operating Contract No. DE-AC05-06OR23177 from Department of Energy.

FIELD OF THE INVENTION

This invention relates to photo detector devices and specifically to a method for designing a completely passive bias compensation circuit to stabilize the gain of the multiple pixel avalanche photo detector devices commonly called MPPC (multi-pixel photon counters) or SiPM (silicon photomultipliers) over a range of temperatures.

BACKGROUND OF THE INVENTION

The multiple pixel avalanche photo detector device commonly called MPPC or SiPM device is a relative newcomer to the field of radiation detection instrumentation but is being increasingly employed as a photo-detection element in critical systems where the gain stabilization is important.

The SiPM exhibits a temperature dependence of gain that is very nearly linear with temperature. Because photodetector gain impacts the ability to perform spectrometric measurements, and influences the timing and energy precision of threshold discrimination circuits—both techniques important in nuclear measurements and particularly in quantitative studies—it is often essential to stabilize the gain of the device with respect to temperature.

Previous approaches to stabilization have included active temperature measurement and control via either varying the applied biasing voltage, by control of a variable gain stage following the signal output of the SiPM, or by means of a look up table that corrects for gain variation after digitization. Where power consumption and cost are not a major concern these approaches are often the appropriate method. If the cost, size or power consumption of the gain stabilization scheme is important, as it is in large arrays of these devices, a low power and small area approach is highly desirable and in some cases can be the only practical approach.

SUMMARY OF THE INVENTION

This invention describes a method for designing a completely passive bias compensation circuit to stabilize the gain of the multiple pixel avalanche photo detector devices commonly called MPPC or SiPM over a range of temperatures. This description includes circuitry design and the approach to determining component values to achieve a desired precision of gain stability. This method is particularly applicable where other approaches to circuitry for temperature sensitive bias control are no longer feasible. Specifically, the method described here involves no active circuitry and is suitable for large arrays where the provision of independent bias supplies for every device is impractical.

The basic concept is that of a temperature dependent voltage divider, with both temperature varying and nominally invariant resistances adjusting the bias voltage to the detector element. The approach can be used with any temperature sensitive detector (or other) device with a nominally linear temperature coefficient of voltage that must be stabilized. Other temperature ranges are accommodated with limitations imposed by the temperature sensitive element characteristics. Devices with non-linear temperature coefficients can be stabilized using the basis of this technique with attention to the selection of temperature sensitive element characteristics.

A negative temperature coefficient resistor in thermal contact with the SiPM device provides a varying resistance related to the device temperature. Where the temperature characteristic of many thermistors is nonlinear the existing and well-known practice of placing an additional resistor in parallel will mitigate that nonlinearity over some limited range.

When that linearized thermistor is made part of a voltage divider, the voltage at the divider output will vary in proportion to the temperature in a nearly linear way over a range of temperatures. Because the gain of the avalanche photodiode cells is a linear function of the applied voltage, and if the voltage divider is constructed so that the slope of this voltage divider change is opposite to the slope of the change of gain in proportion to device temperature, the gain of the avalanche photodiode device can be stabilized to remain constant over a temperature range.

For a single device both slope compensation and the desired gain intercept can be set by specifying a single resistor and then specifying the input voltage to the voltage divider. This simple technique is useful when applied to a single device, but the cost rises when multiple devices (which often possess different characteristics) must be compensated and gain matched.

The problem becomes more challenging when large numbers of devices must have bias solutions that match both slope and intercept. Resistor specification is not difficult, but the impracticality of a large number of precisely controlled independent supply voltages ($V_{Supply}$) is a large impact. The additional circuitry described here provides a practical solution for large array that must be gain matched and temperature compensated, without requiring a large number of different supply voltages.

OBJECTS AND ADVANTAGES

The novel feature of this invention is the method of calculation and analysis that allows design of a three-resistor temperature sensitive voltage divider bias compensation circuit that provides for a reasonably and arbitrarily small set of supply voltages to be used to achieve gain compensation and matching of both slope and intercept of the compensation to within errors of the component tolerances chosen.

The SiPM device is a relative newcomer to the field of radiation detection instrumentation but is being increasingly employed as a photo-detection element in critical systems where the gain stabilization is important. As prices for the SiPM continue to fall they will be more and more attractive for use in larger arrays where packing density and power consumption become important.

An example is the Gluex Barrel Calorimeter (BCAL), which is being installed at the Jefferson National Accelerator Facility in Newport News, Va. and will be used to map the spectrum of gluconic excitations of light mesons. The BCAL detector employs 3840 SiPM devices which must remain gain stable to provide excellent energy and timing resolution, and a low threshold of detection, while operating in high magnetic fields necessary to completely contain the electromagnetic showers resulting from the conversion of photons. The $V_{OP}$ for those SiPM devices is based on the device breakdown voltage (Vbr), and typically ranges over 2.0 V (220% of the Vop-Vbr value). Making use of the three-resistor bias compensation scheme described herein the BCAL will maintain all 3840 SiPM devices within 5% of calibrated gain value over temperature while using only a minimum of different input voltages.

The BCAL bias compensation system of the present invention is designed for acceptable operation at temperatures 15 degrees higher—nominally room temperature—to facilitate offline testing without requiring cooling the entire assembly. The three-resistor bias compensation technique employed for the BCAL will allow operation at any temperature between room temperature and the expected operating temperature without modification. Operation at other temperatures outside of this range can also be accomplished with an adjustment of the $V_{Supply}$ voltages.

Medical imaging systems are also taking advantage of the small size and high density of the SiPM. Medical imaging applications include CT and PET imagers as well as single isotope SPECT and multiple isotope SPECT imaging. In each of these applications the stability of gain may be a requirement to achieve approval for diagnostic use.

DETAILED DESCRIPTION OF THE INVENTION

Figure 1:
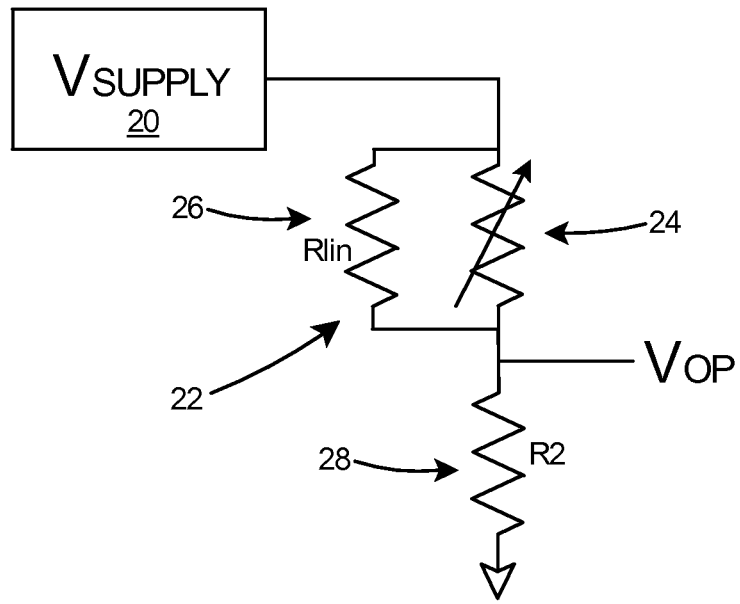
FIG. 1 is a schematic of a two resistor voltage divider bias supply with linearized thermistor element.

With reference to the "two resistor" voltage divider bias network in FIG. 1, which depicts a first embodiment according to the present invention, the two resistor voltage divider includes a voltage supply 20, a linearized thermistor 22 consisting of a thermistor 24 in parallel with a linearizing resistor 26, and a divider resistor 28. To realize appropriate temperature compensation the divider resistor 28, linearized thermistor 22 and bias supply 20 must satisfy two relationships:

(1) $V_{OP}$ at Operating Temperature T $$V_{OP} = \frac{R_2\left[V_{SUPPLY} - I_{LEAK}\left[\frac{R_{Lin}R_{T_0}e^{B_0\left(\frac{1}{T}-\frac{1}{T_0}\right)}}{R_{Lin} + R_{T_0}e^{B_0\left(\frac{1}{T}-\frac{1}{T_0}\right)}}\right]\right]}{R_2 + \frac{R_{Lin}R_{T_0}e^{B_0\left(\frac{1}{T}-\frac{1}{T_0}\right)}}{R_{Lin} + R_{T_0}e^{B_0\left(\frac{1}{T}-\frac{1}{T_0}\right)}}}$$

and (2) Temperature Coefficient of Voltage (TCV) of the Linearized Thermistor Evaluated at Operating Temperature T $$TCV = \frac{B_0 R_{T_0}^2 R_{Lin} e^{2B_0\left(\frac{1}{T}-\frac{1}{T_0}\right)}}{T^2\left[R_{Lin} + R_{T_0}e^{B_0\left(\frac{1}{T}-\frac{1}{T_0}\right)}\right]^2} - \frac{B_0 R_{T_0} R_{Lin} e^{B_0\left(\frac{1}{T}-\frac{1}{T_0}\right)}}{T^2\left[R_{Lin} + R_{T_0}e^{B_0\left(\frac{1}{T}-\frac{1}{T_0}\right)}\right]}$$

Where
TCV=Temperature Coefficient of Voltage (V/K)
T=Temperature for circuit operation (K)
$V_{SUPPLY}$=Bias supply voltage (V)
$I_{Leak}$=Device leakage current (A)
$R_{Lin}$=Resistance of linearizing resistor, placed in parallel with the thermistor (Ω)
$R_2$=Resistance of divider resistor (Ω)
$T_0$=Thermistor reference temperature (K)

The operating temperature T is not necessarily in the center of the operating range. This temperature can be any temperature within the range, and is often selected as the most likely temperature.

With the two conditions of operating voltage and voltage coefficient of temperature satisfied, the temperature compensation voltage divider will provide the proper bias voltage at temperature and will then vary the applied bias as the temperature varies with a slope that is equal to the slope of the gain change in temperature. In this way the circuit will maintain the gain at the selected value.

Operating Groups of Detector Devices from a Single VSupply Source

Whereas the TCG is nearly invariant between devices of a particular manufacture, the operating voltage ($V_{OP}$) of each SiPM varies over several hundred percent of the control range. It is necessary to provide a stabilized voltage value to each individual circuit. This can be impractical for any large array with a large number of SiPM devices.

Figure 2:
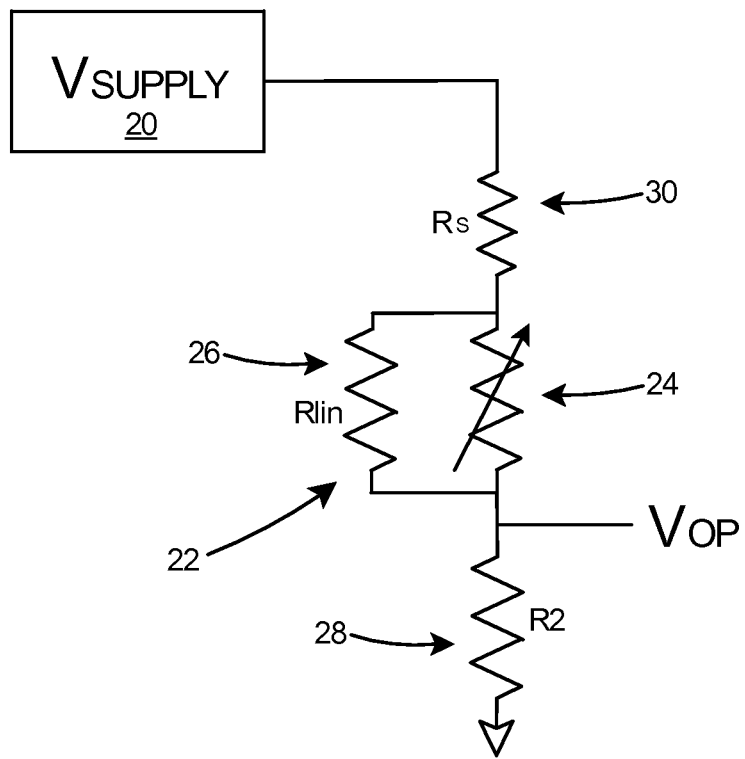
FIG. 2 is a schematic of a three resistor voltage divider bias supply with linearized thermistor element.

Referring to FIG. 2, which depicts a second and preferred embodiment according to the present invention, the method described here allows the use of a three-resistor voltage divider to achieve correct slope and intercept for a range of device operating voltages while requiring only a single input voltage for the bias voltage divider for a large number (group) of circuits. The approach here is then to gather devices with similar characteristics and operate each group from a common $V_{Supply}$ voltage, thus minimizing the number of supplies necessary.

The addition of the third "source" resistor 30 having source resistance $R_S$ provides an offset to allow operation of the two-resistor voltage divider with a wider range of input voltages. This is the design element that allows the use of a much smaller subset of supply voltage values shared within a group of detector devices where a two-resistor voltage divider would require many times more distinct values to achieve both slope and intercept for the same number of detector devices.

For this case with a third resistor the output voltage condition becomes:

$$V_{OP} = \frac{R_2\left[V_{SUPPLY} - I_{LEAK}\left[\left[\frac{R_{Lin}R_{T_0}e^{B_0\left(\frac{1}{T}-\frac{1}{T_0}\right)}}{R_{Lin} + R_{T_0}e^{B_0\left(\frac{1}{T}-\frac{1}{T_0}\right)}}\right] + R_S\right]\right]}{R_S + R_2 + \frac{R_{Lin}R_{T_0}e^{B_0\left(\frac{1}{T}-\frac{1}{T_0}\right)}}{R_{Lin} + R_{T_0}e^{B_0\left(\frac{1}{T}-\frac{1}{T_0}\right)}}} \quad (3)$$

and the TCV condition that must be met becomes:

$$TCV = -\frac{R_2\left[V_{SUPPLY} - I_{LEAK}\left[\frac{R_{Lin}U}{R_{Lin} + U}\right]\right]\left[\frac{B_0 R_{T_0} U^2}{T^2[R_{Lin} + U]^2} - \frac{B_0 R_{Lin} U}{T^2[R_{Lin} + U]}\right]}{\left[R_2 + \frac{R_{Lin}U}{R_{Lin} + U}\right]^2} - \frac{I_{Leak} R_2\left[\frac{B_0 R_{T_0} U^2}{T^2[R_{Lin} + U]^2} - \frac{B_0 R_{Lin} U}{T^2[R_{Lin} + U]}\right]}{\left[R_2 + \frac{R_{Lin}U}{R_{Lin} + U}\right]} \quad (4)$$

Where $$U = R_{T_0}e^{B_0\left(\frac{1}{T}-\frac{1}{T_0}\right)}$$

With the addition of this source resistance $R_S$ a solution set can now be found for a group of SiPM devices that requires only a single stabilized voltage source value.

Summary of Method for Passively Compensating for Temperature Gain

The method for passively compensating for temperature coefficient of gain in a system including a plurality of multiple pixel avalanche photo detector devices, described hereinabove, results in a typically unique set of exact value resistors ($R_S$ and $R_2$) for every SiPM device operating voltage ($V_{OP}$) within a manufacturing lot. In practice some error may be tolerated so that similar devices (that is, SiPM devices with similar $V_{OP}$ characteristics) may have identical resistor solutions.

A variation of the method is applicable which presumes a small subset of fixed input voltage values which can then reduce the number of trimming resistors required. The number of devices in a group that can be supplied by a single $V_{Supply}$ depends on the variation of $V_{OP}$ and the overall number of devices to be powered. Larger groups or those with larger variations will result in reduced performance in matching TCV.

To further minimize costs, the well-known technique of employing binary weighted trim resistors is also assumed that allows a set of resistors (chosen from standard value sets) to be assembled identically for each SiPM device in large set, and then jumpers selected to adjust the total resistance values as required to meet the Vop for each individual device. This approach minimizes cost of fabrication and assembly at the cost of a simple calibration step at final assembly.

These two techniques (input voltages and resistor trimming) can be applied in different measures (weights) depending on the restrictions of the application and the desired errors allowable for gain stabilization.

The method of calculation and analysis that allows design of a three-resistor temperature sensitive voltage divider bias compensation circuit that provides for a reasonably and arbitrarily small set of supply voltages to be used to achieve gain compensation and matching of both slope and intercept of the compensation to within errors of the component tolerances chosen includes the following steps:

1. Determine the Temperature Coefficient of Gain (TCG) for the devices
2. Either directly, or from the TCG and the Gain/Voltage relationship for the devices, determine the Temperature Coefficient of Voltage (TCV) that will compensate the TCG.
3. Select an Input Voltage greater than the highest Vop for all devices. How much greater is determined by the divider current which is generally a function of the thermistor characteristic. Initial iterations may be required to discover a suitable selection.
4. Select a thermistor with characteristics $R_{T0}$ (often R at 25° C.), $T_0$ (often 25° C.) and $B_0$ (Thermistor Beta characteristic at range of temperatures of interest).
5. Select a linearizing resistor $R_{Lin}$ that minimizes nonlinearity of the parallel combination at the operating temperature T so that a best choice tradeoff is made over desired range of temperatures. This selection process may be approached in a variety of ways. Minimizing a set of weighted errors across the operating temperature range is often sufficient.
6. Using the equation below, determine current $I_0$ through the linearized thermistor combination that will result in the desired TCV at the temperature of interest $T_0$. Note that this current would also include the device leakage current if it is significant with respect to the total current.

$$I_0 = \frac{-TCV_{desired}}{\left[\frac{B_0 R_{T_0} U}{T^2 [R_{Lin} + U]^2} - \frac{B_0 R_{Lin} U}{T^2 [R_{Lin} + U]}\right]} \quad (5)$$

where $$U = R_{T_0} e^{B_0\left(\frac{1}{T} - \frac{1}{T_0}\right)}$$

$T$ = Temperature for circuit operation($K$)

7. Determine the exact value of $R_2$ that will result in the correct Vop at the temperature of interest from thermistor current $I_0$ found in step 6 above. Because the current in the linearized thermistor would also include leakage current that does not pass through $R_2$ the leakage current is subtracted here.

$$R_2 = \frac{V_{OP}}{I_0 - I_{Leak}} \quad (6)$$

8. Determine the exact value for $R_S$ that will result in the sum of voltage drops across $R_S$, the linearized thermistor and $R_2$ to equal the supply voltage $V_{Supply}$.

$$R_S = \frac{V_{Supply} - V_{OP}}{I_0} - \frac{R_{Lin} R_{T_0} e^{B_0\left(\frac{1}{T} - \frac{1}{T_0}\right)}}{R_{Lin} + R_{T_0} e^{B_0\left(\frac{1}{T} - \frac{1}{T_0}\right)}} \quad (7)$$

9. Select approximate values for $R_2$ and for $R_S$ from available resistors, or construct resistor combination to more closely approximate the exact values.
10. Repeat steps 7 through 9 for each different device $V_{OP}$. Groups of devices with similar $V_{OP}$ may share the same $V_{Supply}$ in step 8.

Note that granularity of available resistor values, the value tolerances and their temperature coefficients will limit the precision to which the ideal resistance values for $R_2$ and $R_S$ can be practically achieved. Additional resistors used in a trimming scheme will improve the precision but eventually the tolerance and temperature coefficient of the resistor values may dominate beyond trimming the 0.1% level. Estimates of the impacts of component values on circuit performance may be estimated using the following equations.

Sensitivity (V/Ω) of Vop to Variation in $R_2$ is Given by:

$$\frac{dV}{dR_2} = \frac{V_{supply} - I_{Leak}\left[\frac{R_{Lin} U}{R_{Lin} + U}\right]}{R_2 + \left[\frac{R_{Lin} U}{R_{Lin} + U}\right]} - \frac{R_2 \left[V_{Supply} - I_{Leak}\left[\frac{R_{Lin} U}{R_{Lin} + U}\right]\right]}{\left[R_2 + \left[\frac{R_{Lin} U}{R_{Lin} + U}\right]\right]^2} \quad (8)$$

where $$U = R_{T_0} e^{B_0\left(\frac{1}{T} - \frac{1}{T_0}\right)}$$

Sensitivity (V/Ω) of Vop to Variation in $R_S$ is Given by:

$$\frac{dV}{dR_S} = \frac{I_{Leak} R_2}{R_2 + \left[\frac{R_{Lin} U}{R_{Lin} + U}\right]} - \frac{R_2 \left[V_{Supply} - I_{Leak}\left[\frac{R_{Lin} U}{R_{Lin} + U}\right]\right]}{\left[R_2 + \left[\frac{R_{Lin} U}{R_{Lin} + U}\right]\right]^2} \quad (9)$$

where $$U = R_{T_0} e^{B_0\left(\frac{1}{T} - \frac{1}{T_0}\right)}$$

Sensitivity to the temperature coefficient of resistance for divider resistors (exclusive of the thermistor) can be mitigated by maintaining the temperature of the non-thermistor divider components stabilized to within a few degrees C.

Sensitivity to the change in device dark current (leakage) can be important in some applications, particularly where radiation damage can alter the dark rate.

To minimize the effect of changes in dark current on the set point voltage, the initial step of choosing the thermistor should include consideration not only of this additional current but also its change. Selecting a smaller value for the thermistor will increase the divider current (and divider dissipated power) but will make the impact of dark current and its changes much smaller.

Although the description above contains various specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A method for passively compensating for temperature coefficient of gain in a system including a plurality of multiple pixel avalanche photo detector devices, including the steps of:
    (a) providing a voltage supply, a linearized thermistor consisting of a thermistor in parallel with a linearizing resistor, a divider resistor, and a source resistor having a source resistance ($R_S$);
    (b) determining the Temperature Coefficient of Gain (TCG) for the devices;
    (c) determining the Temperature Coefficient of Voltage (TCV) that will compensate the TCG;
    (d) selecting a supply voltage ($V_{Supply}$) greater than the highest operating voltage (Vop) for said plurality of devices;
    (e) selecting a thermistor including a characteristic thermistor reference temperature ($T_0$), thermistor resistance at the reference temperature ($R_{T_0}$), and thermistor beta characteristic parameter ($B_0$);
    (f) selecting a linearizing thermistor ($R_{Lin}$) that minimizes nonlinearity of the parallel combination at the operating temperature;
    (g) determining the current ($I_0$) through linearized thermistor that will result in the desired temperature coefficient of voltage (TCV) at the temperature of interest T wherein $I_0$ is a solution of the relationship $$I_0 = \frac{-TCV_{desired}}{\left[\frac{B_0 R_{T_0} U}{T^2 [R_{Lin}+U]^2} - \frac{B_0 R_{Lin} U}{T^2 [R_{Lin}+U]}\right]}$$

where $$U = R_{T_0} e^{B_0 \left(\frac{1}{T} - \frac{1}{T_0}\right)}$$

and T=Temperature for circuit operation (K);
    (h) determining from the thermistor current ($I_0$) the value of the resistance of divider resistor ($R_2$) that will result in the correct operating voltage (Vop) at the temperature of interest wherein $R_2$ is a solution of the relationship $$R_2 = \frac{V_{OP}}{I_0 - I_{Leak}};$$

(i) determining the value for the source resistance ($R_S$) that will result in the sum of voltage drops across $R_S$, the linearized thermistor and $R_2$ to equal the supply voltage $V_{Supply}$, wherein $R_S$ $$R_S = \frac{V_{Supply} - V_{OP}}{I_0} - \frac{R_{Lin} R_{T_0} e^{B_0\left(\frac{1}{T}-\frac{1}{T_0}\right)}}{R_{Lin} + R_{T_0} e^{B_0\left(\frac{1}{T}-\frac{1}{T_0}\right)}};$$

(j) selecting values for $R_2$ and for $R_S$; and
    (k) repeating steps (h) through (j) for each different device $V_{OP}$.

2. The method of claim 1 wherein the TCV is a solution of the relationship $$TCV = -\frac{R_2 \left[V_{SUPPLY} - I_{Leak}\left[\frac{R_{Lin} U}{R_{Lin}+U}\right]\right]\left[\frac{B_0 R_{T_0} U^2}{T^2[R_{Lin}+U]^2} - \frac{B_0 R_{Lin} U}{T^2[R_{Lin}+U]}\right]}{\left[R_2 + \frac{R_{Lin} U}{R_{Lin}+U}\right]^2} -$$

$$\frac{I_{Leak} R_2 \left[\frac{R_0 R_{T_0} U^2}{T^2[R_{Lin}+U]^2} - \frac{B_0 R_{Lin} U}{T^2[R_{Lin}+U]}\right]}{\left[R_2 + \frac{R_{Lin} U}{R_{Lin}+U}\right]}$$

where $$U = R_{T_0} e^{B_0\left(\frac{1}{T}-\frac{1}{T_0}\right)}.$$

3. A method for passively compensating for temperature coefficient of gain in a system including a plurality of multiple pixel avalanche photo detector devices, including the steps of:
    (a) dividing said plurality of detector devices into groups of detector devices;
    (b) providing a voltage supply, a linearized thermistor consisting of a thermistor in parallel with a linearizing resistor, a divider resistor, and a source resistor having a source resistance ($R_S$);
    (c) determining the Temperature Coefficient of Gain (TCG) for the devices;
    (d) determining the Temperature Coefficient of Voltage (TCV) that will compensate the TCG by finding a solution of the relationship $$TCV = -\frac{R_2 \left[V_{SUPPLY} - I_{Leak}\left[\frac{R_{Lin} U}{R_{Lin}+U}\right]\right]\left[\frac{B_0 R_{T_0} U^2}{T^2[R_{Lin}+U]^2} - \frac{B_0 R_{Lin} U}{T^2[R_{Lin}+U]}\right]}{\left[R_2 + \frac{R_{Lin} U}{R_{Lin}+U}\right]^2} -$$

$$\frac{I_{Leak} R_2 \left[\frac{R_0 R_{T_0} U^2}{T^2[R_{Lin}+U]^2} - \frac{B_0 R_{Lin} U}{T^2[R_{Lin}+U]}\right]}{\left[R_2 + \frac{R_{Lin} U}{R_{Lin}+U}\right]}$$

where $$U = R_{T_0} e^{B_0\left(\frac{1}{T}-\frac{1}{T_0}\right)};$$

(e) selecting a supply voltage ($V_{Supply}$) greater than the highest operating voltage (Vop) for said plurality of devices;
    (f) selecting a thermistor including a characteristic thermistor reference temperature ($T_0$), thermistor resistance at the reference temperature ($R_{T_0}$), and thermistor beta characteristic parameter ($B_0$);

(g) selecting a linearizing thermistor ($R_{Lin}$) that minimizes nonlinearity of the parallel combination at the operating temperature;

(h) determining the current ($I_0$) through linearized thermistor that will result in the desired temperature coefficient of voltage (TCV) at the temperature of interest T;

$$I_0 = \frac{-TCV_{desired}}{\left[\frac{B_0 R_{T_0} U}{T^2[R_{Lin} + U]^2} - \frac{B_0 R_{Lin} U}{T^2[R_{Lin} + U]}\right]}$$

Where $$U = R_{T_0} e^{B_0\left(\frac{1}{T} - \frac{1}{T_0}\right)}$$

and T=Temperature for circuit operation (K);

(i) determining from the thermistor current ($I_0$) the value of the resistance of divider resistor ($R_2$) that will result in the correct operating voltage (Vop) at the temperature of interest;

$$R_2 = \frac{V_{OP}}{I_0 - I_{Leak}}$$

(j) determining the value for the source resistance ($R_S$) that will result in the sum of voltage drops across $R_S$, the linearized thermistor and $R_2$ to equal the supply voltage $V_{Supply}$;

$$R_S = \frac{V_{Supply} - V_{OP}}{I_0} - \frac{R_{Lin} R_{T_0} e^{B_0\left(\frac{1}{T} - \frac{1}{T_0}\right)}}{R_{Lin} + R_{T_0} e^{B_0\left(\frac{1}{T} - \frac{1}{T_0}\right)}}$$

(k) selecting values for $R_2$ and for $R_S$; and (l) repeating steps (i) through (k) for each of said groups of detector devices sharing $V_{Supply}$ values for step (j).

* * * * *